J. B. FISHER.
Sulky-Plow.
No. 203,903. Patented May 21, 1878.
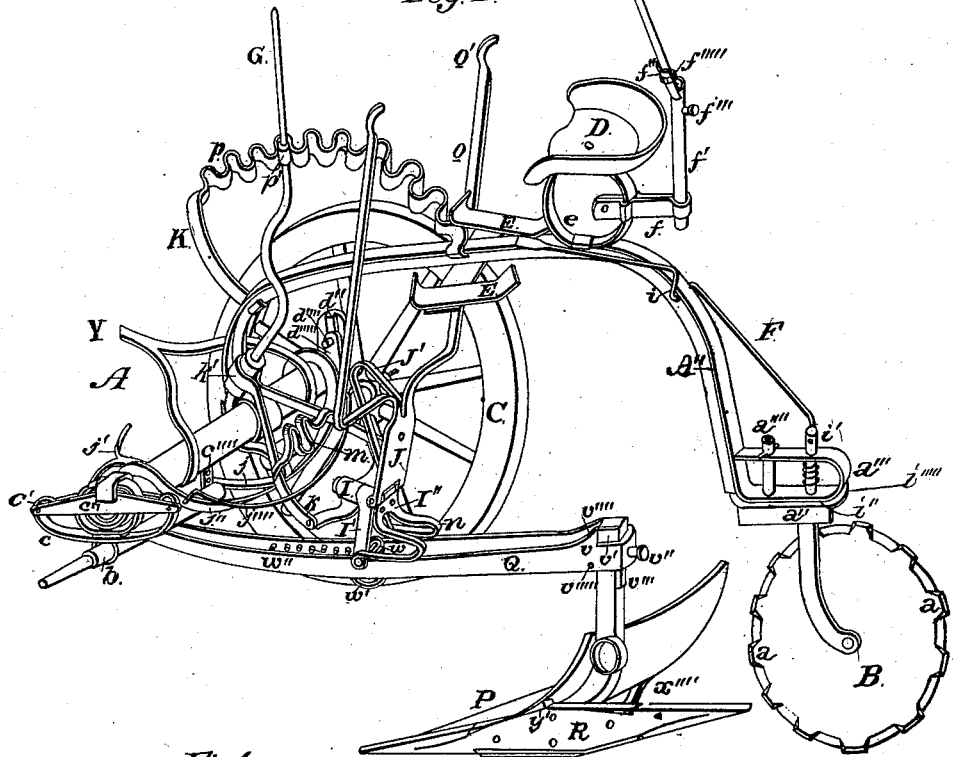
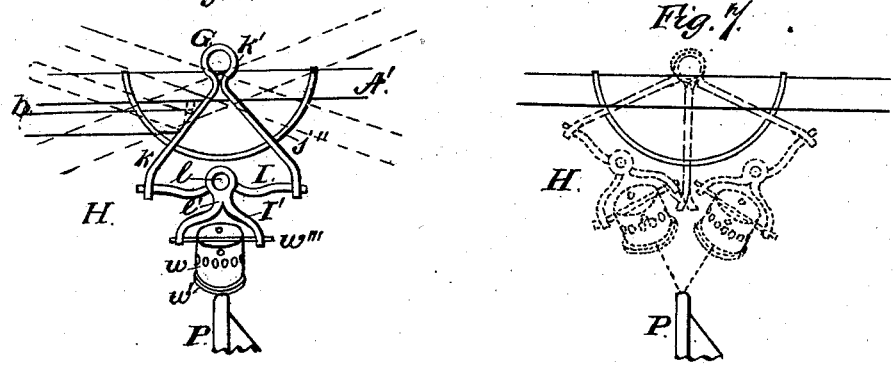

3 Sheets—Sheet 2.
J. B. FISHER.
Sulky-Plow.
No. 203,903. Patented May 21, 1878.
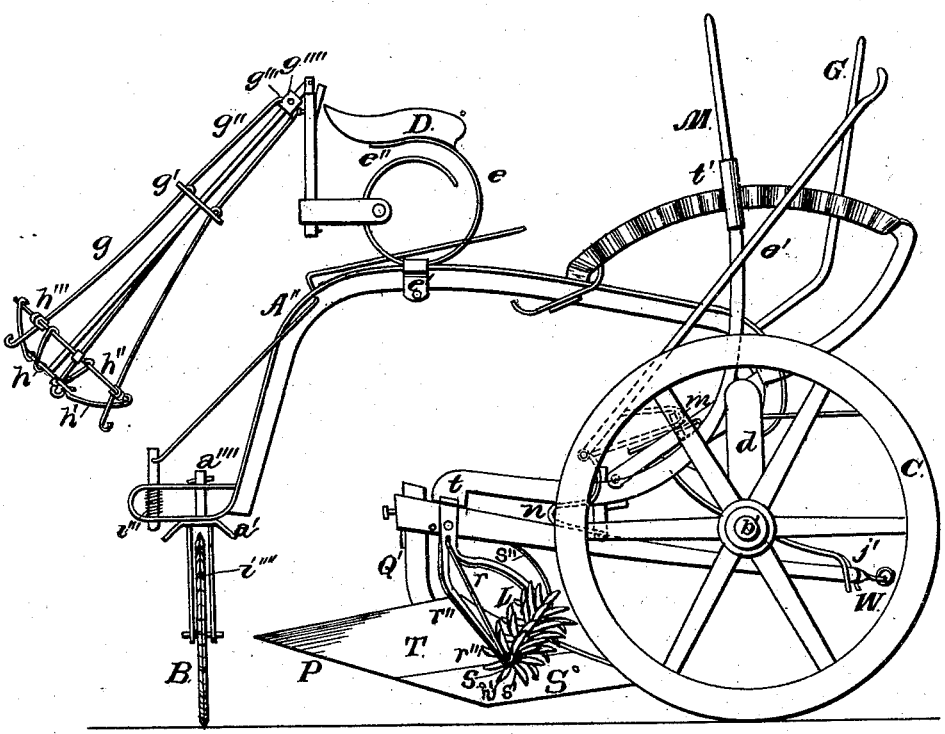
Fig. 2.
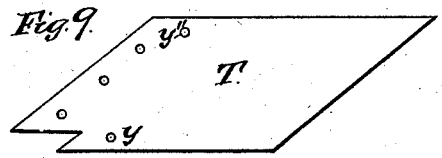
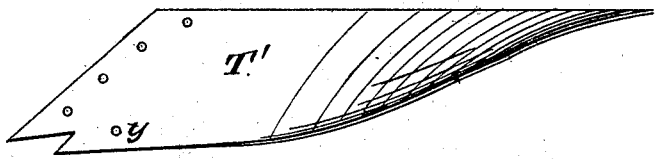
Attest:
J. B. Brock
D. G. Stuart
Inventor:
Jay Bostwick Fisher 3 Sheets—Sheet 3
J. B. FISHER
Sulky-Plow.
No. 203,903. Patented May 21, 1878.
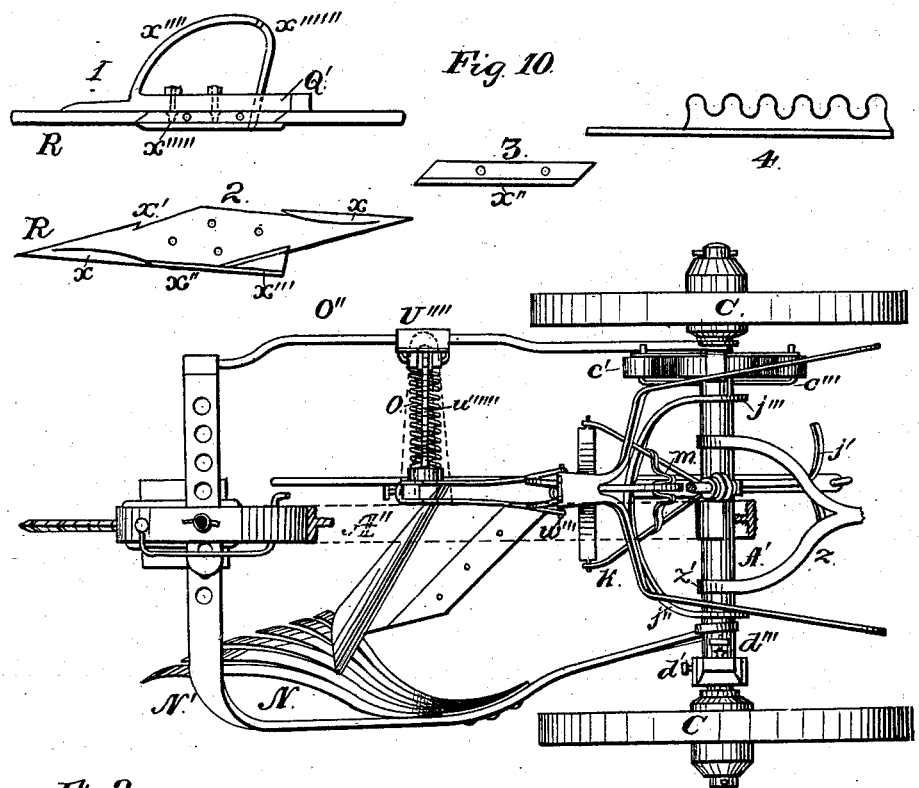

UNITED STATES PATENT OFFICE.

JAY B. FISHER, OF DAVENPORT, IOWA.

IMPROVEMENT IN SULKY-PLOWS.

Specification forming part of Letters Patent No. 203,903, dated May 21, 1878; application filed April 6, 1878.

*To all whom it may concern:*

Be it known that I, JAY BOSTWICK FISHER, of Davenport, in the county of Scott and State of Iowa, have invented certain new and useful Improvements in Sulky-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to that class of agricultural implements commonly known as "sulky-plows," supported on wheels, and provided with a seat having a top.

The invention consists in a new form of plows and furrow-cutter and sulky-frame; and further consists in certain new features, as furrow-guide support, friction-bearing, land-side plate, mold-boards, and share; and still further consists in new combination of devices, all as hereinafter more fully set forth.

Figure 1 is a perspective land-side view of my improved sulky-plow with the land-side wheel and attachments removed. Fig. 2 is the furrow-side view of the same with the furrow-cutter attached and plow raised. Fig. 3 is the top or plan view of my improved sulky-plow with the furrow-cutter and seat, having a top removed. Fig. 4 is a sectional rear view of the same, having the seat and top off. Fig. 5 is a detail view of the springs. Fig. 6 is a detached view of the operating device, showing the tipping of the frame. Fig. 7 is a detached view of the same, showing the central lateral movement. Fig. 8 is a detail view of the modified disk, mold-boards, and scraper. Fig. 9 is a detail view of the modified mold-boards and share. Fig. 10 is a detail view of the land-side plate and post.

In the accompanying drawings, referring to parts by letters, A represents the frame of the sulky-plow, consisting of a tubular axle proper, A', and tri-edged arc-shaped reach A", as shown in Fig. 1. The reach A" is fastened to the axle proper near the center at right angle, and extends back over the plow to the rear of the same, where it is supported by a caster-guide wheel, B, which has beveled projections $a$ and knife cutting-edges between them, for a reliable guide-wheel. Inclined wings $a'$ are fastened to the top edges of the crank-shoulder $a''$. The bearing-box $a'''$, fastened to the rear end of the arc-reach, has its bearing on the lengthwise plate $i''''$ of the crank-shoulder $a''$, which has its vertical-bearing journal-shaft $a''''$ fastened to its front end, and its bearings in the front end of the box $a'''$, and the vertical standards $i'''''$ are fastened to the rear end of the said plate $i''''$.

The axle proper is supported on two wheels, C C, which have their bearings on two spindles or axles, $b$ $b'$. The land-side spindle $b$ has its bearing on spring $c$, which has extended convolute ends $c'$, fastened to the frame $c''$ by means of rod $c'''$ passing through the axle proper and ends of the frame $c''$, which is secured to the end of said axle. The other end of spindle $b$ is adjustably hinged to a perforated post, $c''''$, (see Fig. 1,) fastened to the under side of the axle proper, near the center; the extended convolute spring $c'''''$ being at the bottom part, and having the top part compressed, and fastened down on the top of the axle proper within the frame $c''$.

Spindle $b'$ has its journal-bearing in the vertical post $d$, which secures a lateral adjustment by means of the set-screw $d'$. The beveled rib $d''$, made on the inside of said post, works beveled shoulder $d'''$ made in the end of the axle proper.

The adjustment of post $d$ levels the sulky frame A when the furrow-wheel enters a furrow by means of set-screw $d''''$ working in the vertical post $d'''''$ fastened on the top of the axle proper.

The seat D is adjustably secured on the top of the arc-shaped reach by means of a convolute circular spring, $e$, bolted to the said seat and reach by the clasp-band $e'$. The convolute end $e''$ of the circle $e$ strikes on the inner end and shoves it down on the surface of $e''$, forming an easy, durable, and strong seat-spring. (See Fig. 2.) The foot-rests E are adjustably secured at proper distance from the seat beneath the reach.

To the seat-spring $e$ the clasp-rod of the arm-bearing band $f$ is adjustably bolted, which has a spring-bearing in the other end to receive and secure the sleeve $f'$, which has an elbow, $f''$, at the top. Sleeve $f'$ has a set-screw, $f'''$, to secure and adjust the jointed stem $f''''$ of the top D'. The concave elbow $f''$ receives the top joint of the stem $f''''$, and band $f'''''$ drops over the elbow and secures it therein, to protect the driver from the oblique rays of the hot sun. The adjustable arm-rods $g$ are hinged to the adjustable plate $g'$, which is operated by the rods $g''$, fastened to it, and the other ends to the movable band $g'''$, which has a set-screw, $g''''$. To the plate $h$, fastened to the top of stem $f''''$, are secured the rib-rods $h'$, which extend out and downward, and are fastened to the circle-rod $h''$, as shown in the drawings. On the circle-rod $h''$ are hinged or pivoted double bearing collar-blocks $h'''$, through which the arm-rods $g$ are extended to spread out the cover over the driver, to shield him from the hot sun. The cover folds on the top of the plate $h$ and rod $h''$. Any number of arm-rods $g$ may be used. The cover is fastened to the ends of arm-rods $g$. This forms an excellent top for a sulky-plow.

The lever F has its fulcrum-bearing $i$ in the rear curve near the top of the reach A'', and has its lower end extending down and pivoted in the adjustable lock-pin $i'$, working in the rear end of the bearing-box $a'''$. The other end of said lever passes up by the side of spring $e$, to be operated with the driver's foot.

The lever F raises the lock-pin $i'$ out of a slot, $i''$, made in the rear end of the lengthwise plate $i''''$ of crank-shoulder $a''$, which allows the caster guide-wheel B to turn on its vertical journal-shaft $a''''$ as the sulky-plow turns about at the end of a furrow. (See Fig. 2.) As the sulky-plow assumes a straight line again, the inclined wings $a'$ strike the beveled end of the lock-pin $i'$ and shove it up against the coil-spring $i'''$, which incloses the said pin and has its lower bearing in it, and the upper end against the box $a'''$, which presses it down into the slot again, so that the sulky will steer the plow straight across the field in cutting a ribbon or furrow.

The lever G has its lower end bent under the axle, forming a collar-bearing neck, and there forms an elbow, $j$, and returns back over the front end of the plow-beam, having its end $j'$ bifurcated, which furnishes an upper bearing for the front end of the plow-beam, to balance the same when raising it out of the soil, in conjunction with the lever G. (See Fig. 2.) The elbow $j$ is bolted to the semicircular bar $j''$ at the center. The ends $j'''$ of said bar are hinged to the axle with the lever G, which, being bolted together, form one piece of hinging. The circular rod $j''''$ is bolted to the bar $j''$. H is the operating device, hinged to the lever G. (See Figs. 1, 6, and 7.) The bifurcated arms $k$ have a collar-bearing neck, $k'$, which is hinged to the lever G, and the lower ends of said arms have journal-bearings, in which the ends of yoke I are journaled. To the journal-pin $l$, which is fastened in the center of yoke I, are hinged or pivoted the collar-bearing neck $l'$ of the bifurcated arms I', with the knee-plate I'', which is bolted to the arms I'.

The arms I' and knee-plate I'' have journal-bearing ends.

To the top of the knee-plate I'' the levers J J' are hinged. The lever J' has an elbow, with its end turned back and fastened in the base of lever J. The concave spring collar-bow $m$ is secured to the arms $k$ near the center, in which the lever J' is locked, and adjusts itself to the movements of the operating device H. The arms $k$ have their bearings on the semicircular bar $j''$ and under the circular rod $j''''$, which is bolted to the bar $j''$, to secure and steady the arms $k$ in their up, down, and lateral movements. The knee-pans $n$ of the knee-plate I'' strike on the top of the double beam, which limits the forward movement of the plow by taking the sulky along with it.

The lever J' limits the central lateral movement on the journal-pin $l$ when locked in the collar-bow $m$. The lever J has bifurcated elbow-arms $o$, bent out right and left near the hinging of the knee-plate I'', and then upward, so that the handles $o'$ can be managed by the driver on the seat D (see Fig. 1) when the plow is passing over rough and stony soil without injuring it, and after passing the same the driver can push the handles $o'$ forward, so that the elbow of lever J' will enter the collar-bow $m$, out of the way. (See Fig. 2.) The lever J may be removed from the hinge for smooth and mellow fields.

Lever J gives a lateral movement on the journal-pin $l$ between the hinged neck $k'$ and the plow-point. This movement is a natural one, which permits the plow-point to remain in its natural working position when the plow-beam is moved laterally. (See Fig. 7.)

When the lever J' is locked there is another lateral movement at the lever G, which allows the sulky-frame to tip when running on corn-hill rows and rock, while the plow remains in a perpendicular line or position. (See Fig. 6.) This hinging, being so far above the plow-beam, prevents obstacles from tripping the plow, which it is subject to when placed near the beam, where the circle is too small.

On the top of the front end of the reach A'' is fastened a peculiar-shaped lever-rack, K, having concave spring collar-bows $p$, formed on both sides alike for a double rack. (See Fig. 1.) The collar-bows $p$ form a good double-pressure hold for levers subject to vibration by having the said bows made more than a semicircle, in order to form a clasp-gripe on each side of the spring-bows $p$ to hold the levers therein.

The rubber sleeve $p'$ is placed on the lever G at the place of contact with the collar-bows $p$, in order to secure firmer and easier clasp in the circular bows and much easier ingress and egress, and to prevent rattling. Any soft material or spring may answer for the same purpose, or lining of same may be placed on the collar-bows to secure the same result. The same shaped bows may be formed in a bar on one side for a single lever. (See Fig. 10, No. 4.)

The furrow-cutter L is hinged or pivoted to the double beam of the plow in front of the mold-board. (See Fig. 2.) The frame $r$ of the furrow-cutter L is hinged to the plow-beam, and its lower bifurcated ends have journal-bearings, in which the journal ends of the common axle $r'$ are journaled.

The bifurcated hinge-plate $r''$ is bolted to the frame $r$, and the ends $r'''$ are fastened to the axle $r'$.

The circular blade-shaped scrapers $s$ are fastened to the axle $r'$ between the disk-blade mold-boards $s'$, which revolve independently on the common axle $r'$. The scrapers $s$ have projecting shoulders, to protect the joints from the soil falling onto the axle $r'$ between them and the mold-boards $s'$. (See Fig. 8.)

I intend to use a modified form of mold-boards (see Fig. 8) for different kinds of soil.

Lever M is hinged to the plate $r''$ below the elbow $t$, and extends forward and upward, (see Fig. 2,) so as to work in the opposite side of rack K. The said lever has a semicircular spring-sleeve, $t'$, secured to it at the point of adjustable contact with the rack K, to retain a good and even hold in the up-and-down movement when the plow is raised and lowered by the lever G without dislodgement.

The lever M gages the depth for the cutter L in the furrow-slice cut by the plow. The hinge below the elbow $t$ allows a lateral movement of the plow-beam without affecting the said lever in the rack.

The arm $s''$ of the frame $r$ has its arm-bearing for a parallel draft of the cutter L with the plow on the inside of the furrow-side bar of the double beam. (See Fig. 2.)

The furrow-guide support N is made in shape and form to conform to the natural coil or turn of the ribbon as it is cut and turned over by the plow. The ribbon or furrow-slice turns over onto the guide-suppport N, which prevents it from breaking and doubling up by sliding off evenly and smoothly to its lap-bed, forming a close lap on the old furrow. The guide-support N may be made of sheets, strips, or rods. The divided and perforated guide-support N is adjustably bolted to a bar, N', which is hinged in front to the axle or frame of the sulky, and its rear end is bent and perforated, so as to work adjustably in the box $a'''$ with the journal-shaft $a''''$. (See Figs. 3 and 2.) I may need a rod to connect it (the support N) with the mold-board.

The coil friction-spring O has cup-caps $u$ $u'$ secured to each end. The cup-cap $u$ is fastened to the post of the plow, and the cap $u'$, on the other end, has a sleeve-journal bearing, $u''$, which is pivoted to the adjustable arms $u'''$, which are hinged also to the lever O' at its elbow-bearing. The lever O' is pivoted to an adjustable bearing-plate, $u''''$, which is also pivoted to the rod O'', which has its front end hinged to the spindle $b$, and the rear bent end is perforated and adjustably secured in the bearing-box $a'''$ with journal $a''''$. The upper end of lever O' works in the rack O''', which is fastened to the reach. (See Fig. 3, dotted lines.) Before raising the plow the lever O' is loosed and moves forward in its rack by the release of the spring O, and, raising the plow, the said spring brings the arms $u'''$ up with it by shoving the lower end of the lever out in making a circle on the elbow-hinge. At the lower end of lever O' is an elbow-bearing, $u'''''$, which is a support for the hinged arms $u'''$. A bent or double rod, $u''''''$, is fitted within the coil-spring O, to stiffen and regulate its equal side and up-and-down pressure, having the outer ends free to slide through the cup $u$ as the pressure takes up the spring O. The lever O' regulates the pressure of the coil-spring O.

P is the improved plow. The beam Q is bent round the post Q', forming double bars, which have double shoulder-braces V, bearing against the projecting side shoulders V' at the top of the post Q'.

The set-screw V'', working in the rear end of the double bars, holds and adjusts the wedges V''' V''''. Wedge V'''' is correspondingly moved up and down between the post Q' and pin V''''' fastened in the bottom of the double bars.

The double beam Q has a central perforated and adjustable cog-bearing tubular brace, $w$, which has a circular rim, $w'$, on the lower edge, on which the lower edges of the double beam rest.

Cog-pins $w''$ are placed in one of the double bars of the beam Q, which mesh into the perforated tubular central bearing-brace $w$, to adjust the said brace $w$ back and forth, as required to suit the soil. (See Figs. 1, 6, and 7.)

The adjustable connecting-pin $w'''$ has its bearings in the top edges of the central bearing-brace $w$, and resting on the top edges of the double beam Q, and then passing through the bearing ends of I' I'', which extend down against the sides of the double beam, to hold the double bars firmly against the central brace $w$, which forms a strong brace, and allows quite a circular or oscillating movement of the plow by the bar that has no cog-pins slipping back and forth between the brace $w$ and the ends of the bearings I'. This allowance obviates a cramp strain of the plow.

The arms I' are inclined slightly to form a brace, so that the plow will not rise up without striking an obstacle, which sends the sulky forward while it rises, after which it falls back again automatically into its former working position without dislodging the levers G J' M. This obstacle-release is secured by means of the journal ends of yoke I and connecting-pin $w'''$, which allows sufficient freedom for that purpose.

The reversible land-side plate R is made wedge shape from each end to the center, to be used end for end and upside down.

The sides are made straight from end to end and have four countersunk holes and bearing-grooves, $x$, for the ends of the share. (See Fig.

8.) There are four diagonal beveled shoulders, $x'$, cut just below the center of the edges, and taper out thereat.

Between the shoulders $x'$ is adjustably fastened to the bottom edge of said plate a rib-shoe, $x''$. The rib $x'''$ may extend to the rear end of the shoe $x''$, or have any length required. (See Fig. 8.) The rib-shoe forms a smooth bottom for the said plate, and the rib steadies the plow and secures a horizontal draft.

The post $Q'$ has its lower end divided, and the short end is a support for the reversible share S, and the long end forms an elbow-support, $x''''$, for the mold-board T, and has its end shouldered for a brace in the rear hole of plate R. The beveled rims $x'''''$ on the edges of the holes made in the post $Q'$ fit into the corresponding countersunk holes in the plate R, to relieve a strain on the bolts which secure the plate R to the post $Q'$, forming the frame-work of the plow P. (See Fig. 8.) The share S is made oval, hoe-shaped to cutting-edges, and spiral. (See Fig. 8.) It has three holes made equidistant through the center, and is adjustably bolted on the surface of the mold-board T T', tapering to an edge as it is turned end for end. (See Fig. 2.) The mold-board T has a beveled shoulder, and is perforated and secured to the frame-work of the plow P by means of a corresponding shoulder which fits into the beveled shoulders $x'$, (see Fig. 9,) and the screw $y$ passes through the wedge $y'$ into the front hole of the rib-shoe $x''$ and $y''$ into the elbow $x''''$. The mold-board T is longer and wider than usual in front, in order to raise and turn the entire furrow-slice upside down and admit free work of the cutter L, while the rear is quite abrupt, to throw the slice high and light for stubble-plowing. The modified sod mold-board T' is still longer in length, and has a full straight surface from edge to edge throughout its entire spiral length, to raise and turn the ribbon sod as it is cut by the share S without curving it in the center.

The mold-boards and share are cut in the form of parallelograms. The longest points of the share S, having smaller angles, and likewise longer cutting-edges, than usual, combined with a slight inclination of the land-side plate R, reduce the draft of the plow P.

The clevis W is a bar twisted over at right angles, and adjustably perforated at both ends and bolted to the front end of the double beam Q, by which the plow is drawn, and taking the sulky along with it by means of the operating device at the knee-pans $n$.

The adjustable tongue Y has its brace-arms, $z$, at their ends, made in the form of circular springs $z'$, which are bolted to and pass up over the axle proper, which holds it in proper position.

The four distinct functions of the lever G are, first, the hinging of the operating device H; second, the raising and lowering of the plow P; third, the supporting of the semicircular bar $j''$; and, fourth, the lower end bearing of $j'$ to balance the plow P. The combined functions of the land-side axle bearing-springs, the hinging of the operating device to the lever G, and cog-bearing tubular brace operate together in securing the natural horizontal, lateral, and circular or oscillating movements assumed by the working plow in cutting a ribbon or furrow across the field. The springs allow the land-side wheel to pass over obstacles in crossing the field without affecting the horizontal position or raising the plow-point out of the soil. The hinging of the device to the lever G permits the same wheel to run on corn-hill rows without moving the plow from its perpendicular or lateral position. The cog-bearing brace between the double beam allows the plow to oscillate in passing obstacles without cramping it or twisting the frame of the sulky.

Having thus fully described my invention, I claim—

1. A sulky-frame consisting of the axle $A'$, arc-shaped reach $A''$, wheels C C, spindles $b$ $b'$, and caster guide-wheel B, constructed substantially as and for the purpose specified.

2. A caster guide-wheel, B, having projections $a$ and knife cutting-edges between them, substantially as and for the purpose specified.

3. The caster guide-wheel B having projections $a$, and cutting-edges between them, and having the upright standards $i''''$ fastened to the rear end of the lengthwise plate $i'''''$, having wings $a'$ and slot $i''$ between the said standards $i''''$, and having the vertical journal-shaft $a''''$, on which the caster guide-wheel B operates, secured to the front end of said plate $i'''''$, in order to form a long bearing crank shoulder, $a''$, and strong lockage at the rear end, formed and operating substantially as and for the purpose specified.

4. The caster guide-wheel B having projections $a$, and cutting-edges between them, and having the upright standards $i''''$ fastened to the rear end of the lengthwise plate $i'''''$, having wings $a'$ and slot $i''$ between the said standards, and having the vertical journal-shaft $a''''$, on which the caster guide-wheel turns, secured to the front end of said plate $i'''''$, in combination with the bearing-box $a'''$ and lock-pin $i'$, pivoted to the lever F, all operating together for the purpose of cutting a straight furrow across the field, substantially as shown, for the purpose specified.

5. The combination of an arc-shaped reach, $A''$, with the seat D, convolute-spring support $e$, foot-rests, clasp-band $e'$, bolted so as to be adjusted back and forth, and arm-bearing band $f$, bolted to the seat-spring $e$, to hold and adjust the top $D'$, substantially as and for the purpose specified.

6. The combination of the arm-bearing band $f$ with the seat D, elbow-sleeve $f'$, jointed stem $f''''$, adjustable rod-band $g'''$, adjustable arm-rods $g$, plate $g'$, plate $h$, and collar-block $h'''$, substantially as and for the purpose specified.

7. The combination of the top D', consisting of the elbow-sleeve $f'$, jointed stem $f''''$, adjustable rod-band $f'''$, plate $g'$, plate $h$, rim-rods $k'$, circular rod $h''$, and collar-blocks $h'''$, all constructed substantially as and for the purpose specified.

8. Lever O', having an elbow-support bearing, $u''''$, provided with hinged arms $u'''$, which have the other end pivoted to the sleeve of cup $u'$, to allow the friction-spring O to rise and lower with the plow, and plate $u''''$, hinged to the lever O', for its fulcrum adjustment, substantially as and for the purpose specified.

9. The coil-spring O, having cup-caps $u$ $u'$, sleeve-bearing $u''$, and bent or double rod $u'''''$, substantially as and for the purpose specified.

10. The combination of the friction coil-spring O, having cup-caps $u$ $u'$, sleeve-bearing $u''$, and bent or double rod $u''''''$ with the post Q', lever O', rod O'', and rack O''', substantially as and for the purpose specified.

11. The combination of rod O'' with the axle-lever O', having plate $u'''$ and journal-shaft $a''''$, substantially as and for the purpose specified.

12. The combination of the furrow-guide support N, having its lower end divided, as shown, and upper end perforated, with the bar N' and plow P, to operate substantially as described, for the purpose set forth.

13. In a sulky-plow, the combination of an adjustable bar, N', with the axle-furrow guide support N, and journal-shaft $a''''$, substantially as and for the purpose specified.

14. The lever G, with its respective elbow $j$, bolted to the bar $j''$, which is hinged with it to the axle or frame of the sulky, and bearing bifurcated end $j'$, substantially as and for the purpose specified.

15. The arms $k$, having a bearing-collar, $k'$, and collar-bow, $m$, constructed substantially as and for the purpose specified.

16. The combination of the yoke I, having journal ends and journal-pin $l$, with the arms I', knee-plate I'', and arms $k$, substantially as and for the purpose specified.

17. The combination of the arms $k$, having the collar-bow $m$, with the elbow-lever J', to lock the central lateral movement of the plow-beam, semicircular bar $j''$, and rod $j'''$, substantially as and for the purpose specified.

18. The perforated tubular cog-bearing brace $w$ provided with a bearing-rim, $w'$, and connecting-pin, $w'''$, constructed substantially as and for the purpose specified.

19. The combination of the perforated tubular cog-bearing brace $w$, provided with a bearing-rim, $w'$, and connecting-pin $w'''$, with the double beam Q, one bar having cog-pins, arms I', and knee-plate I'', having the knee-pans $n$, to operate substantially as and for the purpose specified.

20. In a sulky-plow, the combination of the operating device H, consisting of the arms $k$, yoke I, arms I', knee-plate I'', and levers J J', with the double beam Q, having the cog-brace $w$, and lever G, having bifurcated end $j'$, the elbow $j$, bolted to the bar $j''$, having bar $j'''$, and axle or frame of the sulky-plow, substantially as and for the purpose specified.

21. The lever G, having the elbow $j$, bolted to the bar $j''$, having hinged ends $j'''$ and bifurcated end $j'$, in combination with the frame A or axle and journal-bearing collar-neck $k'$, substantially as and for the purpose specified.

22. The combination of the hinged lever J, having elbow-arms $o$ and handles $o'$, with the knee-plate I'', elbow-lever J', and seat D, to regulate the lateral movement of the plow, substantially as and for the purpose specified.

23. In combination, the elbow-lever J' with the spring collar-bow $m$ and knee-plate I'', for the purpose of locking the lateral movement of the plow, substantially as and for the purpose specified.

24. The lever-rack K, having the spring collar-bows $p$, made more than semicircular in form, in order to clasp and hold the levers, substantially as shown, for the purpose set forth.

25. The combination of the lever-rack K, having the spring collars-bows $p$, with the arc-shaped reach and lever G, substantially as and for the purpose specified.

26. In combination, the sleeve-rubber $p'$ with the rack K and lever G, for the purpose of securing a safe and firm vibrating hold of the lever in the collar-bows, with easy adjustment, substantially as and for the purpose specified.

27. In combination, the lap-spring sleeve $t'$ with the lever M and rack K, for the purpose of securing an up-and-down movement of lever M in the collar-bows $p$, when raising and lowering the plow, and lateral movement, substantially as and for the purpose specified.

28. In combination, the hinged lever M, made adjustable up and down by the lap-spring sleeve $t'$, to correspond with the vertical motion of the plow by the lever G, operating substantially as and for the purpose specified.

29. In combination, the furrow-cutter L, consisting of the disk-blade mold-boards $s'$, divided, as shown, with cutting-edges the whole length of each blade and dishing from the center of the mold-boards to the end of blades, circular blade-scrapers $s$, as shown, having two blades on each sleeve, secured to the axle between the said mold-boards, to remove obstruction from between the divisions of the blades, and frame $r$, having axle $r'$ and arms $r''$, with the plow-beam Q, mold-board T, and share S, for the purpose of dividing the furrow-slice as it passes over the said mold-board and share, substantially as and for the purpose specified.

30. The land-side reversible plate R, made wedge shape from the ends to the center, to be used end for end and upside down, having a rib-shoe, $x''$, constructed substantially as and for the purpose specified.

31. The combination of the reversible land-side plate R, made wedge shape from the ends to the center, and having a rib-shoe, $x''$, with the post $Q'$, made substantially as and for the purpose specified.

32. In a plow, the combination of an adjustable double-beam, Q, post $Q'$, land-side reversible plate R, mold-boards T, and reversible share S, substantially as and for the purpose specified.

In testimony that I claim the foregoing as my own I affix my signature in the presence of two witnesses.

JAY BOSTWICK FISHER.

Witnesses:
J. M. WILLBUR,
T. C. DICKINSON.